United States Patent
Remillard et al.

(10) Patent No.: US 7,131,253 B2
(45) Date of Patent: Nov. 7, 2006

(54) CROP HARVESTING HEADER WITH CROP DIVIDER MEMBERS CARRIED ON THE REEL

(75) Inventors: Rheal G. Remillard, St. Joseph (CA); Abraham Jacob Van Liere, Lethbridge (CA)

(73) Assignee: MacDon Industries Ltd., Winnipeg (CA)

( * ) Notice: Subject to any disclaimer, the term of this patent is extended or adjusted under 35 U.S.C. 154(b) by 0 days.

(21) Appl. No.: 11/266,476

(22) Filed: Nov. 4, 2005

(65) Prior Publication Data

US 2006/0201126 A1    Sep. 14, 2006

(51) Int. Cl.
*A01D 34/00* (2006.01)
(52) U.S. Cl. ..................................... 56/14.4
(58) Field of Classification Search ............... 56/14.4, 56/314, 220–227, 364, 120, 130
See application file for complete search history.

(56) References Cited

U.S. PATENT DOCUMENTS

| | | | | |
|---|---|---|---|---|
| 3,145,520 A | * | 8/1964 | Hume et al. | 56/220 |
| 3,472,008 A | * | 10/1969 | Hurlburt | 56/226 |
| 4,067,177 A | * | 1/1978 | Tout | 56/226 |
| 5,595,053 A | * | 1/1997 | Jasper et al. | 56/226 |
| 5,768,870 A | * | 6/1998 | Talbot et al. | 56/364 |
| 6,170,244 B1 | * | 1/2001 | Coers et al. | 56/226 |
| 6,195,972 B1 | * | 3/2001 | Talbot et al. | 56/364 |
| 6,591,598 B1 | | 7/2003 | Remillard et al. | |
| 6,843,045 B1 | * | 1/2005 | Bickel | 56/14.4 |

* cited by examiner

*Primary Examiner*—Árpád Fábián Kovács
(74) *Attorney, Agent, or Firm*—Adrian D. Battison; Michael R. Williams; Ryan W. Dupuis

(57) ABSTRACT

A crop harvesting header includes a cutter bar arranged across a forward edge, a draper or auger transport arrangement for transporting the cut crop, and a reel mounted on reel arms having a plurality of reel bats at spaced positions around the reel axis each reel bat having reel fingers projecting generally radially outwardly from the reel axis. Each bat is mounted for pivotal movement about its bat axis. At both ends of each bat is mounted a crop divider which pivots with the bat and is formed with a plate lying in a radial plane of the bat with angularly spaced fingers around the outer edge. A leading edge of the plate and front finger is convexly curved relative to the concave curve of the front edge of the finger and is angularly advanced relative to the leading edge of the adjacent fingers such that the rotating crop dividers on the reel co-operate with a stationary crop on the header to separate the cut crop from uncut crop passing alongside the end of the header.

19 Claims, 5 Drawing Sheets

CROP HARVESTING HEADER WITH CROP DIVIDER MEMBERS CARRIED ON THE REEL

This invention relates to a crop harvesting header including a cutter bar and a reel for controlling movement of the crop in the area over the cutter bar in which the reel is rotatable about an axis generally parallel to the cutter bar and has a plurality of reel bats each having reel fingers projecting generally radially outwardly from the reel axis and particularly to an arrangement for improving crop separation between cut and uncut crop at the end of the header.

BACKGROUND OF THE INVENTION

One problem which arises with crop harvesting headers of this type is that of separating the crop at the end of the header so that there is a clear separation between crop passing inwardly of the end of the header which goes to the knife and is therefore cut and must be separated from the crop which passes outwardly of the end of the header and therefore remains uncut. Improper separation of the crop materials, particularly in crops which tend to entangle, can cause crops to be pulled into the knife at the end of the header so that blockages can occur in this location due to the inability of the knife to cut all of the crop which is pulled in from beyond the end of the header.

Conventionally a header of this type includes a generally conical separator which extends forwardly from the end wall of the header converging to a narrow front edge which passes through the crop and therefore acts as a crude separator. In many cases there is provided a curved wire element which extends forwardly from this conical separator forwardly and upwardly so as to assist in penetrating the crop at the area to be separated in advanced of the header reaching the crop.

Some crops such as rice and various forage crops such as cane and sorghum provide a high level of entanglement so it is difficult to separate the crop simply using the wire on the cone.

There are various attachments which can be mounted on the end of the header including stationary and rotary knives which stand in a vertical plane at the end of the header acting to cut the crop at the line of separation. These devices tend to be relatively expensive and require additional motors and mountings which can lead to additional complexity and therefore potential breakdown.

SUMMARY OF THE INVENTION

It is one object of the present invention to provide an improved harvester of the above general type in which there is provided an improved arrangement for separating cut crop from non-cut crop at the ends of the header.

According to a first aspect, therefore, crop harvesting header comprising:

a header frame structure arranged for movement in a direction of working movement across ground carrying a crop to be harvested;

a cutter bar arranged across a forward edge of the header frame structure for cutting the crop, the cutter bar having ends at respective ends of the header;

a cut crop transport arrangement mounted on the header frame structure for receiving and transporting the cut crop for further processing;

and a reel for controlling movement of the crop in the area over the cutter bar, the reel having ends at respective ends of the header;

the reel being mounted on the header frame structure for movement therewith in the direction of movement and for rotation about a reel axis generally parallel to the cutter bar;

the reel having a plurality of reel bats at spaced positions around the reel axis each reel bat having a row of axially spaced reel fingers projecting generally outwardly from the reel axis;

each of at least some of the bats having mounted on at least one end thereof axially spaced from an endmost one of the fingers a crop divider member which rotates with the reel around the reel axis for engaging crop at the end of the reel;

each divider member being shaped differently from the fingers and shaped for dividing the crop such that a part of the crop inboard of the reel end to be cut by the cutter bar is separated by the divider members from a part of the crop outboard of the reel end which passes outwardly of the respective end of the cutter bar and is not cut.

The term "bat" as used herein is intended to be synonymous with the term "rock shaft" or "tine tube" as used herein as all terms are intended to merely refer to the elements on which the reel "fingers" or "tines" are mounted for pivotal movement about a longitudinal axis of the "bat" or "rock shaft" or "tine tube" without implying that the element is necessarily a shaft or implying that the element is non-circular in cross section.

While it is preferable that each bat has two divider members with a respective one of the divider members on each end, the number of divider members may be reduced from this theoretical maximum by omitting some.

Preferably each of the reel bats is pivotal about its respective bat axis parallel to the reel axis so as to vary the angle of the fingers about the bat axis as the reel rotates and wherein the fingers and the divider member which are carried on a bat are attached to the bat such that the pivotal movement of the bat causes pivotal movement of the fingers and divider member.

Preferably the fingers are curved such that the leading edge thereof, when viewed in side elevation, is concave and such that the trailing edge thereof, when viewed in side elevation, is convex and the leading edge of each divider member, when viewed in side elevation, is convex, that is curved in the opposite direction to assist in separation while acting to discard the crop rather than carry it as is the function of the fingers. The term "curved" as used herein does not require that the shape be continuously or smoothly curved and straight portions and angles may be used in the shape of the fingers and the divider members.

Preferably leading edge of the at least one divider member, when viewed in side elevation, is angularly advanced relative to the leading edge of the fingers.

Preferably an angular extent of the divider members from the leading edge to the trailing edge is greater than an angular extent of the fingers from the leading edge to the trailing edge.

Preferably an outer edge of each of the divider members includes a plurality of angularly spaced fingers. In the example shown hereinafter the number of fingers is four but this may be increased or decreased, even to form in effect a single finger, in accordance with the requirements of different designs.

Preferably each of the divider members includes a plate portion mounted at an axis of the bat thereof and lying generally in a radial plane of the axis with a plurality of angularly spaced fingers extending generally radially outwardly from an outer edge of the plate portion.

Preferably at least one of the fingers is bent from the radial plane so as to be inclined radially outwardly and along the axis. However the fingers may be all bent inwardly or may be coplanar with the plate portion.

Preferably a leading one of the fingers is coplanar with the plate portion and alternate ones of remaining ones of the fingers are bent from the radial plane so as to be inclined radially outwardly and along the axis toward the end of the reel.

Preferably the divider members are arranged in an endmost radial plane of the bat.

Preferably there is provided a fixed divider on the header at an end of the cutter bar and wherein the divider members are arranged above and cooperates with the fixed divider to effect separation of the crop.

According to a second aspect of the invention there is provided a crop harvesting header comprising:

a header frame structure arranged for movement in a direction of working movement across ground carrying a crop to be harvested;

a cutter bar arranged across a forward edge of the header frame structure for cutting the crop, the cutter bar having ends at respective ends of the header;

a cut crop transport arrangement mounted on the header frame structure for receiving and transporting the cut crop for further processing;

and a reel for controlling movement of the crop in the area over the cutter bar, the reel having ends at respective ends of the header;

the reel being mounted on the header frame structure for movement therewith in the direction of movement and for rotation about a reel axis generally parallel to the cutter bar;

the reel having a plurality of reel bats at spaced positions around the reel axis each reel bat having a row of axially spaced reel fingers projecting generally outwardly from the reel axis;

each of at least some of the bats having mounted on at least one end thereof axially spaced from an endmost one of the fingers a crop divider member which rotates with the reel around the reel axis for engaging crop at the end of the reel;

wherein in respect of each bat having at least one divider member thereon:

each of the fingers of the bat extends angularly from a leading edge to a trailing edge;

the at least one of the divider members extends angularly from a leading edge to a trailing edge;

the fingers are curved such that the leading edge thereof, when viewed in side elevation, is concave and such that the trailing edge thereof, when viewed in side elevation, is convex;

and the leading edge of each divider member, when viewed in side elevation, is convex.

According to a third aspect of the invention there is provided a crop harvesting header comprising:

a header frame structure arranged for movement in a direction of working movement across ground carrying a crop to be harvested;

a cutter bar arranged across a forward edge of the header frame structure for cutting the crop, the cutter bar having ends at respective ends of the header;

a cut crop transport arrangement mounted on the header frame structure for receiving and transporting the cut crop for further processing;

and a reel for controlling movement of the crop in the area over the cutter bar, the reel having ends at respective ends of the header;

the reel being mounted on the header frame structure for movement therewith in the direction of movement and for rotation about a reel axis generally parallel to the cutter bar;

the reel having a plurality of reel bats at spaced positions around the reel axis each reel bat having a row of axially spaced reel fingers projecting generally outwardly from the reel axis;

each of at least some of the bats having mounted on at least one end thereof axially spaced from an endmost one of the fingers a crop divider member which rotates with the reel around the reel axis for engaging crop at the end of the reel;

wherein in respect of each bat having at least one divider member thereon:

each of the fingers of the bat extends angularly from a leading edge to a trailing edge;

the at least one of the divider members extends angularly from a leading edge to a trailing edge;

and the leading edge of the at least one divider member, when viewed in side elevation, is angularly advanced relative to the leading edge of the fingers.

According to a fourth aspect of the invention there is provided a crop harvesting header comprising:

a header frame structure arranged for movement in a direction of working movement across ground carrying a crop to be harvested;

a cutter bar arranged across a forward edge of the header frame structure for cutting the crop, the cutter bar having ends at respective ends of the header;

a cut crop transport arrangement mounted on the header frame structure for receiving and transporting the cut crop for further processing;

and a reel for controlling movement of the crop in the area over the cutter bar, the reel having ends at respective ends of the header;

the reel being mounted on the header frame structure for movement therewith in the direction of movement and for rotation about a reel axis generally parallel to the cutter bar;

the reel having a plurality of reel bats at spaced positions around the reel axis each reel bat having a row of axially spaced reel fingers projecting generally outwardly from the reel axis;

each of at least some of the bats having mounted on at least one end thereof axially spaced from an endmost one of the fingers a crop divider member which rotates with the reel around the reel axis for engaging crop at the end of the reel;

wherein in respect of each bat having at least one divider member thereon:

each of the fingers of the bat extends angularly from a leading edge to a trailing edge;

the at least one of the divider members extends angularly from a leading edge to a trailing edge;

and an angular extent of the at least one divider member from the leading edge to the trailing edge is greater than an angular extent of the fingers from the leading edge to the trailing edge.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
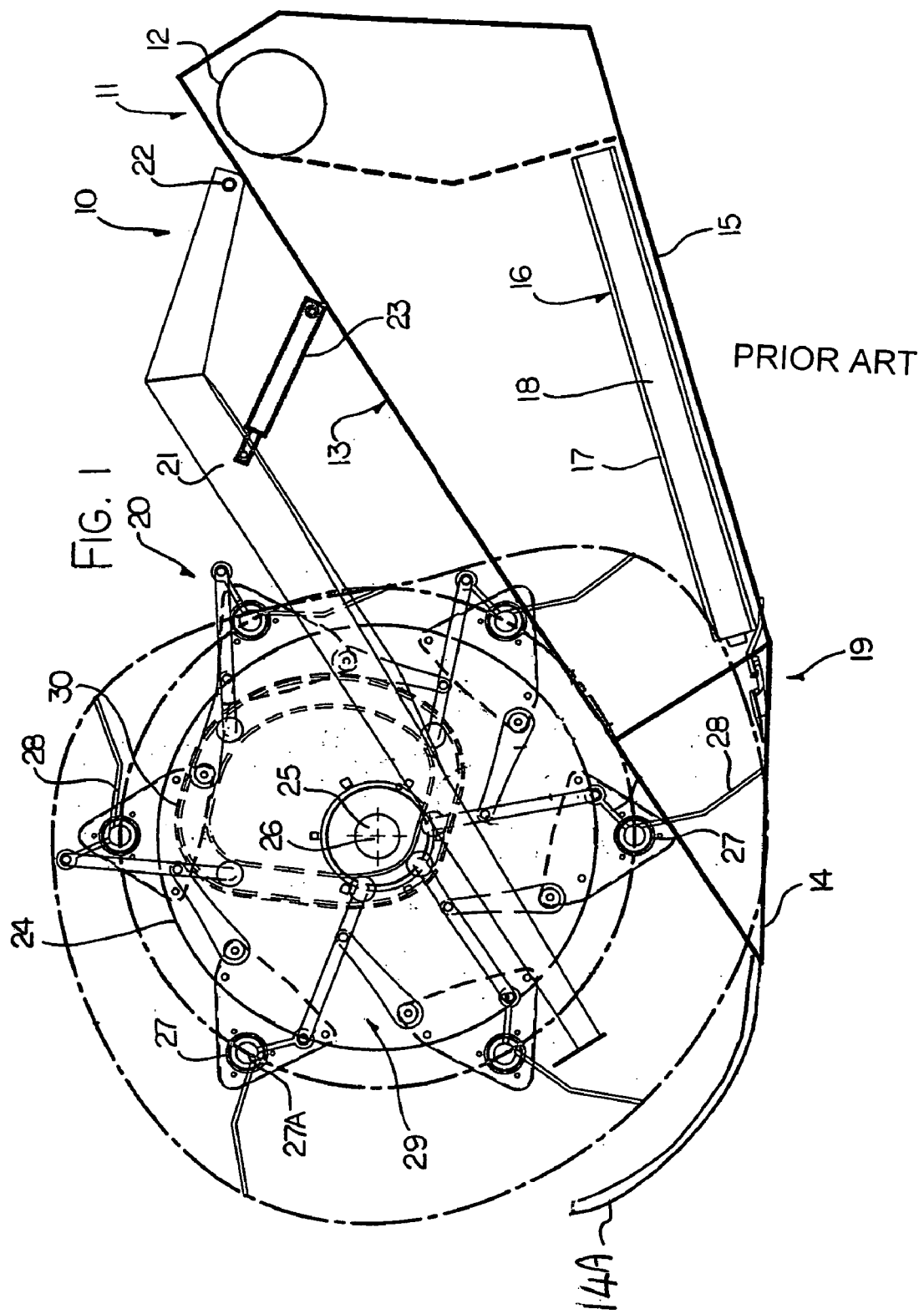
FIG. 1 is a schematic view of a header shown in the above U.S. Pat. No. 6,591,598 looking along the header toward one end and showing the reel, reel support arms, tine tubes, table, header frame, frame end sheet, cam and control linkages, with the end mounting disks of the reel omitted for convenience of illustration.
Figure 5:
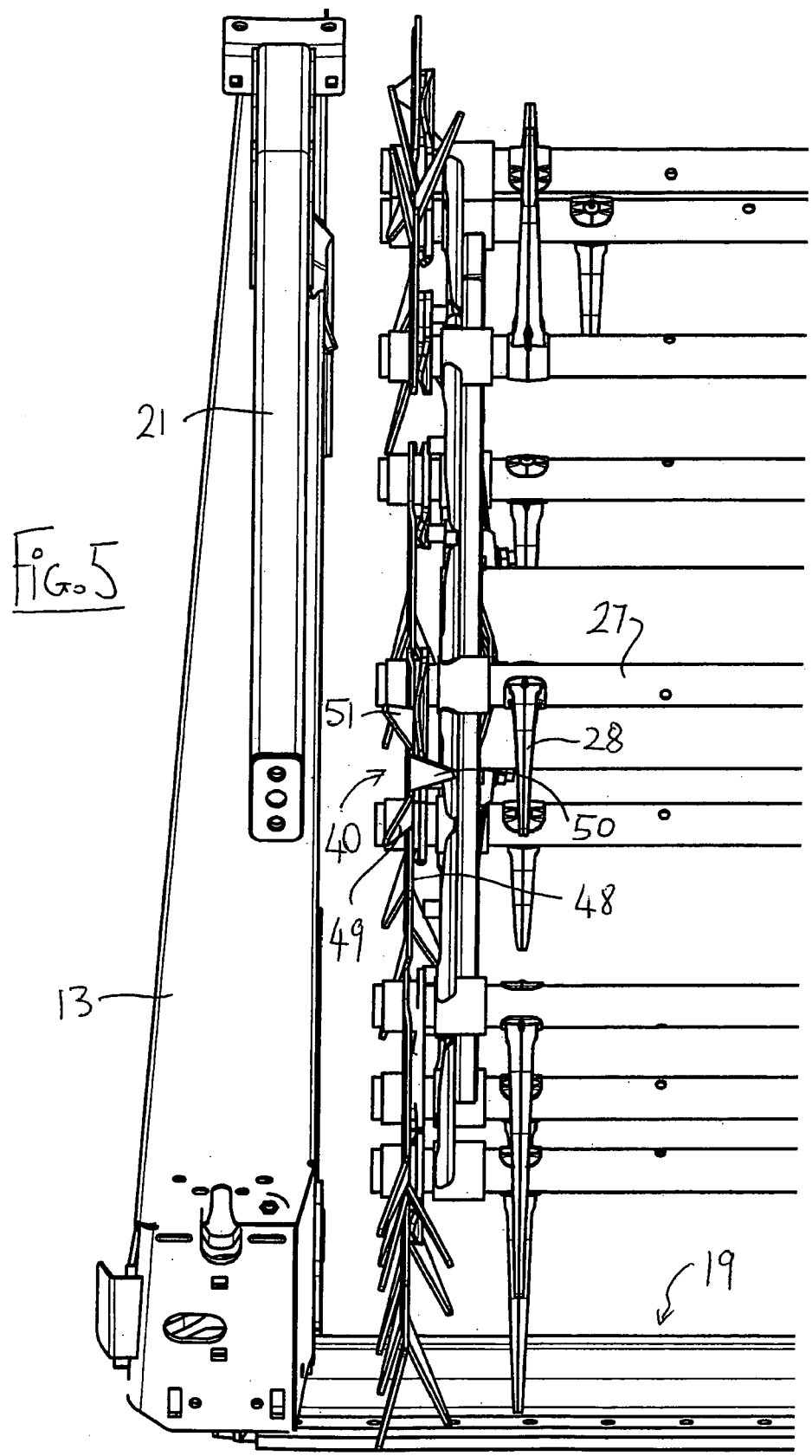
FIG. 5 is front elevational view of one end of the header of FIG. 2 with the mounting for the reel omitted for convenience of illustration.

In FIGS. 1 and 5 is shown an embodiment of a header of the type with which the present invention is concerned with a number of the elements being shown schematically since the general construction of such headers is well known to one skilled in the art. The header 10 includes a header frame 11 having a main frame tube 12 extending across the width of the header between two end frames one of which is shown at 13 and the other of which is of course at the other end and therefore not visible in the elevation of FIG. 1. The main tube 12 is suitably supported and attached on a propulsion vehicle in a manner so that the header frame can be moved forwardly across the ground in cutting a standing crop. The end frame 13 extends forwardly from the main tube 12 to a forward nose section 14 which forms a divider so that crop to be cut passes on one side and crop which is to remain uncut and thus cut in a subsequent pass is separated and passes to the other side. A wire 14A is often provided at the tip of the divider 14 and is curved forwardly and upwardly therefrom to initially engage the crop as the header is moved forwardly.

The main tube 12 carries a plurality of frame bars which extend downwardly and forwardly for supporting a table 15 of the header onto which crop material is deposited after cutting. The structural elements defining the frame bars on the table are not shown for convenience of illustration since again these are well known to one skilled in the art and can vary in accordance with engineering considerations.

On the table 15 is provided a crop conveyor 16 which is arranged to transport the crop after cutting across the width of a header to a discharge location. In the embodiment shown the conveyor is provided as a draper canvas 17 mounted on rollers 18. Other embodiments can use alternative crop transportation systems and primarily an auger which is commonly used as an alternative for the draper system. The embodiments of the present invention are not limited to either of the different types of header.

At the front of the table 15 is provided a cutter bar generally indicated at 19 which is again only shown schematically since the construction of this is well known to one skilled in the art. The cutter bar shown provides a sickle knife in guards which reciprocates back and forth in a cutting action on the standing crop so that the crop is deposited on the draper for transportation to the discharge location.

When used on a combine harvester the discharge location is associated with a crop transfer system which transfers the crop rearwardly into the feeder house of the combine. Headers of this type can of course also be used as a swather where the discharge location simply discharges the crop onto the ground in a swath or through a crop conditioner onto the ground.

The header further includes a reel generally indicated at 20. The reel 20 includes mounting arms 21 pivoted on a suitable mounting 22 adjacent the tube 12 so that the arms project forwardly from the frame to a position over the end frame elements 13 so as to provide support for the reel extending the header above the cutter bar. Each arm is movable in its pivotal action by a suitable drive actuator 23.

The number of arms can vary in accordance with engineering requirements depending upon the width of the header. Some headers have only arms at the ends and some have additional arms intermediate the ends to provide the necessary support.

The reel further includes end support discs, one of which is shown only schematically in FIG. 1 as a circle at the end of the reel but it will be appreciated that the structural arrangement of the disc can vary in accordance with engineering requirements. The end disc is indicated at 24 and is mounted on a shaft 25 which supports the disc for rotation about an axis 26 of the reel.

The disc supports a plurality of reel bats 27 at angularly spaced positions around the axis 26. Each reel bat carries a plurality of longitudinally spaced fingers 28 which project outwardly from the bat for engaging the crop. Each reel bat is pivotal about its own individual axis parallel to the axis 26 so as to change the angular position of the fingers around the axis 27A of the bat. The angular position of the bat about its axis is controlled by a linkage 29 of the bat which co-operates with a cam 30 of the reel so that, as the bats rotate, the linkage moves the bats to the required angular position in dependence upon the co-operation of the linkage with the cam.

Arrangements of this general type are well known and conventional as discussed in the prior art set forth above. The following description relates to the modifications and improvements set forth in the present application and refers to the details shown in FIG. 1 and the further drawings.

Figure 2:
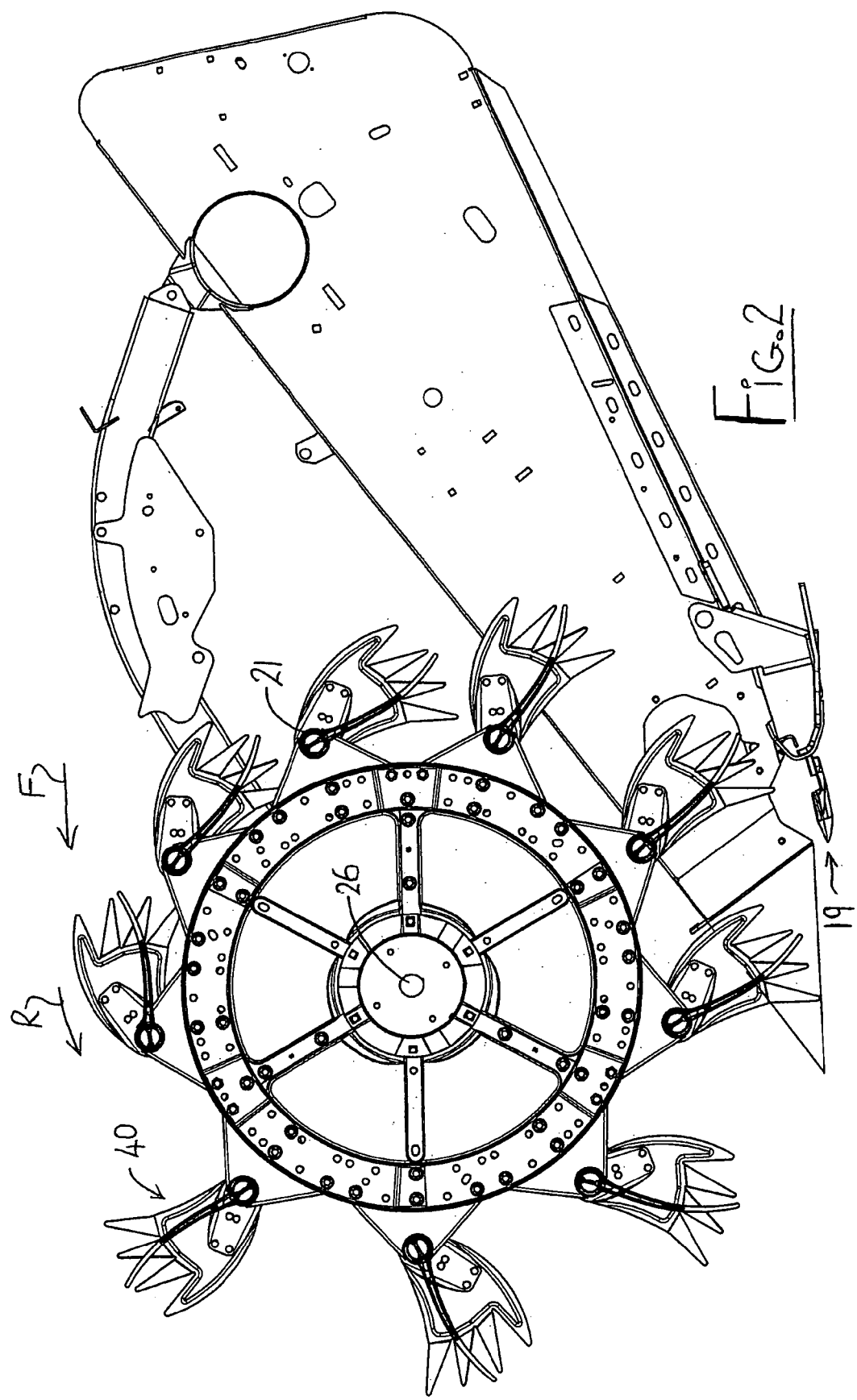
FIG. 2 is an end elevation of the reel of FIG. 1 including one embodiment of the divider members of the present invention.

As shown in FIG. 2, each tine tube 27 carries a pair of end divider members 40. Thus in the preferred arrangement each tine tube carries two of the divider members one arranged at each end. The divider members are located in the end plane of the respective tine tube so that each of the divider members lies in a radial plane of the shaft 26.

Each divider member 40 is mounted on a respective tine tube 27 so that it pivots with the tine tube in the pivoting action described in the above patent. Thus it will be noted in FIG. 2 that the reel rotates in the clockwise direction as indicated at R and the header is moving in the forward direction toward the right as indicated at F. In the arrangement the reel is moved to a forward most and lowermost position which is suitable for harvesting crops of the entangled type where the crops tend to lie on the ground and thus require to be lifted from the ground over the knife 19. Thus the fingers move so that as they approach the ground the fingers are moved into an advanced position angularly around the respective tine tube axis thus tending to engage into the crop on the ground and to lift the crop upwardly and rearwardly as the reel rotates. The fingers then move to a retarded position so that they trail behind the respective tine tube in the area above the knife thus tending to lift out of the crop.

Figure 3:
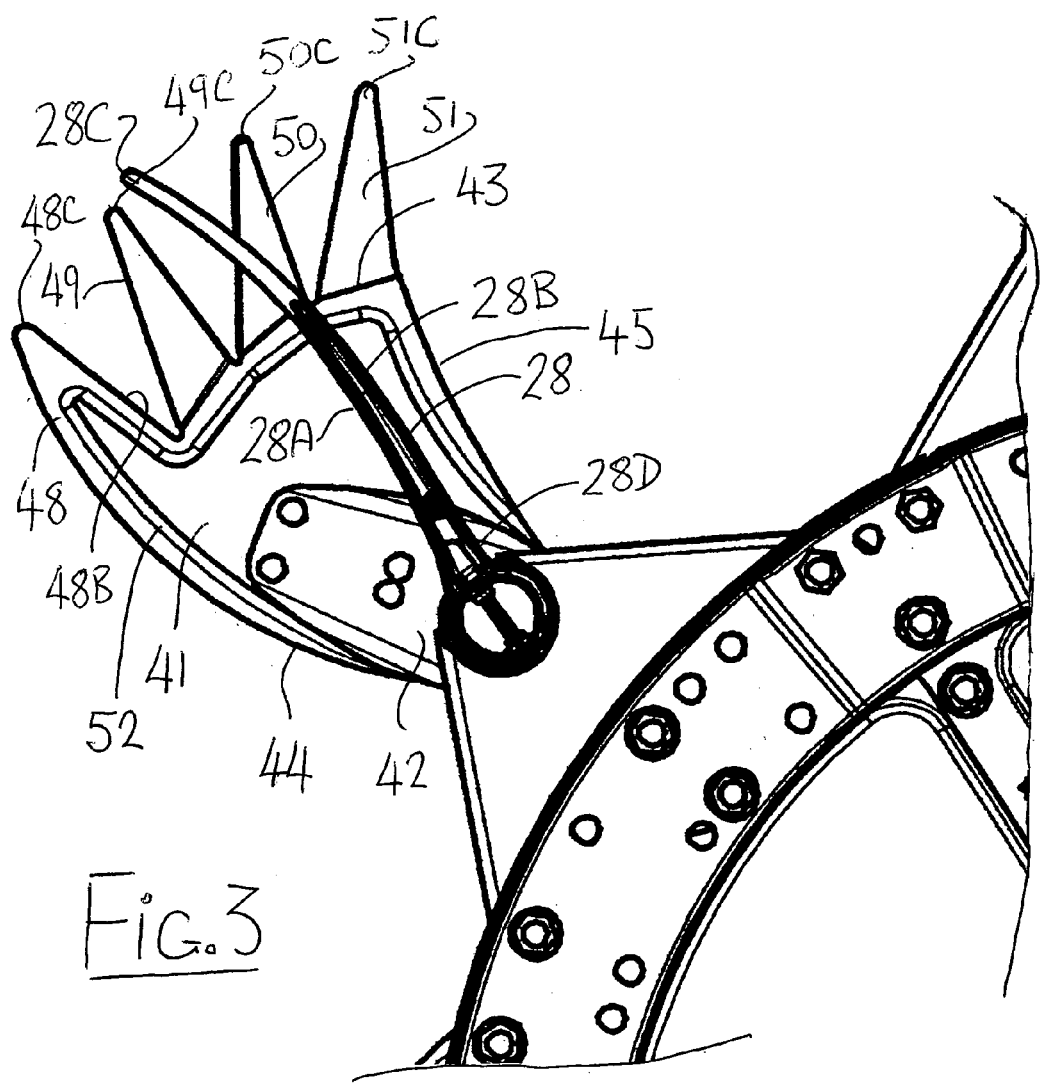
FIG. 3 is an enlarged end elevational view of one of the divider members of FIG. 2.
Figure 4:
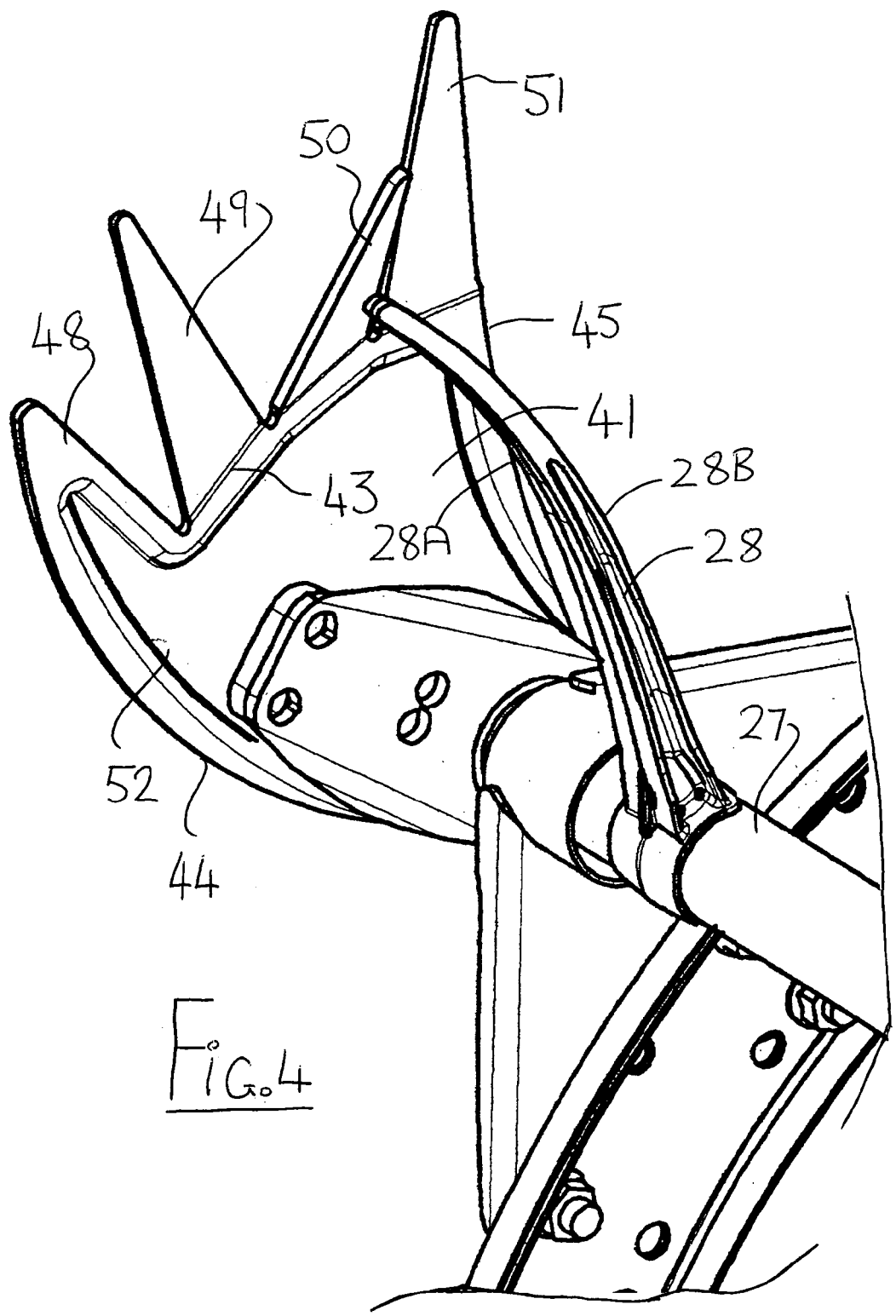
FIG. 4 is an enlarged isometric view of one of the divider members of FIG. 2.

As best shown in FIGS. 3 and 4, each finger 28 includes a leading edge 28A and a trailing edge 28B. The fingers are curved so that a tip 28C is arranged angularly forwardly of a base 28D of the respective finger. Thus the leading edge 28A is curved in a concave direction from the base toward the tip and the trailing edge 28B is convex. This assists the finger from engaging into the crop and lifting the crop in the area at the bottom of the reel as it rotates.

Each divider member comprises a plate portion 41 which is mounted on the tine tube 27 in a radial plane of the tine tube. The plate portion includes a base 42 attached to the tine tube. In the arrangement shown this includes, at the end of the reel where is located the cam plate, a member which bolts to or is fastened to the cam plate. At the opposite end where there is no cam plate, a suitable mounting can comprise a short sleeve welded to the plate portion which surrounds and is fastened to the tube. However alternative mounting techniques can be used as will be well known to a person skilled in the art. The plate portion extends outwardly to an outer edge 43. The plate portion includes a leading edge 44 and a trailing edge 45. It will be noted from FIG. 3 that the angular extent of the plate portion and the divider member between the leading edge 44 and the trailing edge 45 is considerably larger than the angular extent of the finger between the leading edge 28A and the trailing edge 28B. Thus the plate portion in effect acts as a blade lying in the radial plane.

It will be further noted that the leading edge 44 is curved so that it is convex and the trailing edge 45 is concave. Thus the curvature is opposite to that of the finger. Thus the leading edge 44 tends to shed the crop material more effectively than the finger since the crop material can slide outwardly over the leading edge 44 in view of its reverse curvature.

Yet further it will be noted from FIG. 3 that the leading edge 44 is significantly advanced angularly relative to the leading edge 28A of the finger.

It will be appreciated that the fingers of each tine tube lie in a common axial plane so that they are aligned along the tine tube. The divider members at each end of the tine tube are similarly aligned but have the features set forth above of the reverse curvature, the angular advance of the leading edge 44 and the increased angular extent of the divider member.

At the outer edge 43 of the plate is provided a plurality of fingers indicated at 48, 49, 50 and 51. The fingers are spaced angularly around the axis of the tine tube so that the first finger 48 has a leading edge contiguous with the leading edge 44 of the plate portion 44.

Each of the fingers has an outer apex with the apexes arranged such that they lie slightly inwardly of a circle containing the tips of the tines 28 and surrounding the tine tube so that the extent of the fingers is the maximum allowable without contacting the cutter bar or other element which could cause damage. The apexes are curved approximately around a circle surrounding the axis of the reel so that when the tine tube is turned to present the fingers to their maximum radial extent from the axis of the reel, the fingers are substantially coextensive from the axis of the reel and thus each of the fingers can reach its maximum extent without danger of any one of the fingers contacting the cutter bar.

The finger 48 has a trailing edge 48B which extends generally inwardly toward the tine tube so that the finger has an outer apex 48C and then increases in width as it approaches the outer edge 43 of the plate portion 41. Thus the first finger 48 is generally triangular in side elevation. The finger 48 lies in a common plane with the plate portion that is the radial plane of the tine axis.

The three further fingers 49, 50 and 51 are also generally triangular in shape so that each extends outwardly to a respective apex 49C, 50C and 51C. These apexes are staggered rearwardly and spaced rearwardly by a greater distance than the spacing between the fingers at the base so that each of the fingers tends to incline outwardly and rearwardly relative to the leading edge 44 so that the finger 51 has the greatest angle of rearward extent.

As best shown in FIG. 4, it will be noted that the fingers 49, 50 and 51 are bent out of the plane of the plate portion 41 in alternate directions. Thus the finger 49 is bent so that it is inclined outwardly away from the end of the tine tube. The finger 50 is bent in the opposite direction so that it extends outwardly and inwardly along the tine tube. Again the finger 51 is bent so that it extends coplanar with the finger 49 that is outwardly of the end of the tine tube.

The divider members thus engage into the crop as the reel rotates and the leading edge 44 engages into the crop causing the leading edge to slide through the crop out to the tip 48C of the finger 48. The crop then tends to slide rearwardly over the outer edge of the plate member and engages in turn each of the angularly spaced fingers 49, 50 and 51. These fingers being bent slightly at an angle of the order of 10° to 20° from the plane of the plate portion tend to force the crop apart as the fingers move through the crop while the crop slides over each side of the plate portion.

Each divider member in turn engages into the crop as the reel rotates. As the divider members are located in the end plane of the reel as defined by the end plane of the tine tubes, the divider members lie substantially in the common plane with the wire 14A and the cone 14. Thus the divider members cooperate in the action of dividing the crop with those elements at the end of the header.

The divider member can be formed of any suitable material such as metal or plastics. When formed from plastics material, a stiffening bead 52 can be provided which extends around the outer edge of the plate portion and into the finger 48. The bead thus stiffens the plate portion and stiffens the main finger 48 since this takes the majority of the forces as the divider member engages into and slides through the crop material at the dividing location.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

The invention claimed is:

1. A crop harvesting header comprising:
a header frame structure arranged for movement in a direction of working movement across ground carrying a crop to be harvested;
a cutter bar arranged across a forward edge of the header frame structure for cutting the crop, the cutter bar having ends at respective ends of the header;
a cut crop transport arrangement mounted on the header frame structure for receiving and transporting the cut crop for further processing;
and a reel for controlling movement of the crop in the area over the cutter bar, the reel having ends at respective ends of the header;
the reel being mounted on the header frame structure for movement therewith in the direction of movement and for rotation about a reel axis generally parallel to the cutter bar;

the reel having a plurality of reel bats at spaced positions around the reel axis with each reel bat having a row of axially spaced reel fingers projecting generally outwardly from the reel axis;

each bat being mounted for pivotal movement about a bat axis parallel to the reel axis, the angular position of each of the bats about its axis being controlled by a linkage of the bat which co-operates with a cam of the reel so that, as the reel rotates, the linkage moves the bats to a required angular position in dependence upon the co-operation of the linkage with the cam;

each of at least some of the bats having mounted on at least one end thereof axially spaced from an endmost one of the fingers a crop divider member which crop divider member is axially spaced from the linkage, rotates with the reel around the reel axis for engaging crop at the end of the reel and pivots with the bat about the bat axis;

each divider member being shaped differently from the fingers and shaped for dividing the crop such that a part of the crop inboard of the reel end to be cut by the cutter bar is separated by the divider members from a part of the crop outboard of the reel end which passes outwardly of the respective end of the cutter bar and is not cut.

2. The header according to claim 1 wherein the bats and divider members thereon are arranged such that at each end of the reel there are a plurality of the divider members lying in a common radial plane of the reel.

3. The header according to claim 2 wherein each bat has two divider members with a respective one of the divider members on each end.

4. The header according to claim 1 wherein in respect of each bat having at least one divider member thereon:

each of the fingers of the bat extends angularly from a leading edge to a trailing edge;

the at least one of the divider members extends angularly from a leading edge to a trailing edge;

the fingers are curved such that the leading edge thereof, when viewed in side elevation, is concave and such that the trailing edge thereof, when viewed in side elevation, is convex;

and the leading edge of each divider member, when viewed in side elevation, is convex.

5. The header according to claim 1 wherein in respect of each bat having at least one divider member thereon:

each of the fingers of the bat extends angularly from a leading edge to a trailing edge;

the at least one of the divider members extends angularly from a leading edge to a trailing edge;

and the leading edge of the at least one divider member, when viewed in side elevation, is angularly advanced relative to the leading edge of the fingers.

6. The header according to claim 1 wherein in respect of each bat having at least one divider member thereon:

each of the fingers of the bat extends angularly from a leading edge to a trailing edge;

the at least one of the divider members extends angularly from a leading edge to a trailing edge;

and an angular extent of the at least one divider member from the leading edge to the trailing edge is greater than an angular extent of the fingers from the leading edge to the trailing edge.

7. The header according to claim 6 wherein an outer edge of each of said at least one divider members includes a plurality of angularly spaced fingers.

8. The header according to claim 6 wherein each of said at least one divider members includes a plate portion mounted at an axis of the bat thereof and lying generally in a radial plane of the axis with a plurality of angularly spaced fingers extending generally radially outwardly from an outer edge of the plate portion.

9. The header according to claim 8 wherein at least one of the fingers is bent from the radial plane so as to be inclined radially outwardly and along the axis.

10. The header according to claim 9 wherein a leading one of the fingers is coplanar with the plate portion and alternate ones of remaining ones of the fingers are bent from the radial plane so as to be inclined radially outwardly and along the axis toward the end of the reel.

11. The header according to claim 1 wherein the at least one divider member is arranged in an endmost radial plane of the bat.

12. The header according to claim 1 wherein there is provided a fixed divider on the header at an end of the cutter bar and wherein the at least one divider member is arranged above and cooperates with the fixed divider to effect separation of the crop.

13. A crop harvesting header comprising:

a header frame structure arranged for movement in a direction of working movement across ground carrying a crop to be harvested;

a cutter bar arranged across a forward edge of the header frame structure for cutting the crop, the cutter bar having ends at respective ends of the header;

a cut crop transport arrangement mounted on the header frame structure for receiving and transporting the cut crop for further processing;

and a reel for controlling movement of the crop in the area over the cutter bar, the reel having ends at respective ends of the header;

the reel being mounted on the header frame structure for movement therewith in the direction of movement and for rotation about a reel axis generally parallel to the cutter bar;

the reel having a plurality of reel bats at spaced positions around the reel axis each reel bat having a row of axially spaced reel fingers projecting generally outwardly from the reel axis;

each of at least some of the bats having mounted on at least one end thereof axially spaced from an endmost one of the fingers a crop divider member which rotates with the reel around the reel axis for engaging crop at the end of the reel;

wherein in respect of each bat having at least one divider member thereon:

each of the fingers of the bat extends angularly from a leading edge to a trailing edge;

the at least one of the divider members extends angularly from a leading edge to a trailing edge;

the fingers are curved such that the leading edge thereof, when viewed in side elevation, is concave and such that the trailing edge thereof, when viewed in side elevation, is convex;

and the leading edge of each divider member, when viewed in side elevation, is convex.

14. The header according to claim 13 wherein the leading edge of the at least one divider member, when viewed in side elevation, is angularly advanced relative to the leading edge of the fingers.

15. The header according to claim 13 wherein an angular extent of the at least one divider member from the leading edge to the trailing edge is greater than an angular extent of the fingers from the leading edge to the trailing edge.

16. A crop harvesting header comprising:
a header frame structure arranged for movement in a direction of working movement across ground carrying a crop to be harvested;
a cutter bar arranged across a forward edge of the header frame structure for cutting the crop, the cutter bar having ends at respective ends of the header;
a cut crop transport arrangement mounted on the header frame structure for receiving and transporting the cut crop for further processing;
and a reel for controlling movement of the crop in the area over the cutter bar, the reel having ends at respective ends of the header;
the reel being mounted on the header frame structure for movement therewith in the direction of movement and for rotation about a reel axis generally parallel to the cutter bar;
the reel having a plurality of reel bats at spaced positions around the reel axis each reel bat having a row of axially spaced reel fingers projecting generally outwardly from the reel axis;
each of at least some of the bats having mounted on at least one end thereof axially spaced from an endmost one of the fingers a crop divider member which rotates with the reel around the reel axis for engaging crop at the end of the reel;
wherein in respect of each bat having at least one divider member thereon:
each of the fingers of the bat extends angularly from a leading edge to a trailing edge;
the at least one of the divider members extends angularly from a leading edge to a trailing edge;
and the leading edge of the at least one divider member, when viewed in side elevation, is angularly advanced relative to the leading edge of the fingers.

17. The header according to claim 16 wherein an angular extent of the at least one divider member from the leading edge to the trailing edge is greater than an angular extent of the fingers from the leading edge to the trailing edge.

18. The header according to claim 16 wherein the at least one divider member includes a plate portion mounted at an axis of the bat thereof and lying generally in a radial plane of the axis with a plurality of angularly spaced fingers extending generally radially outwardly from an outer edge of the plate portion.

19. A crop harvesting header comprising:
a header frame structure arranged for movement in a direction of working movement across ground carrying a crop to be harvested;
a cutter bar arranged across a forward edge of the header frame structure for cutting the crop, the cutter bar having ends at respective ends of the header;
a cut crop transport arrangement mounted on the header frame structure for receiving and transporting the cut crop for further processing;
and a reel for controlling movement of the crop in the area over the cutter bar, the reel having ends at respective ends of the header;
the reel being mounted on the header frame structure for movement therewith in the direction of movement and for rotation about a reel axis generally parallel to the cutter bar;
the reel having a plurality of reel bats at spaced positions around the reel axis each reel bat having a row of axially spaced reel fingers projecting generally outwardly from the reel axis;
each of at least some of the bats having mounted on at least one end thereof axially spaced from an endmost one of the fingers a crop divider member which rotates with the reel around the reel axis for engaging crop at the end of the reel;
wherein in respect of each bat having at least one divider member thereon:
each of the fingers of the bat extends angularly from a leading edge to a trailing edge;
the at least one of the divider members extends angularly from a leading edge to a trailing edge;
and an angular extent of the at least one divider member from the leading edge to the trailing edge is greater than an angular extent of the fingers from the leading edge to the trailing edge.

* * * * *